(12) United States Patent
Samid (10) Patent No.: US 10,395,053 B2
(45) Date of Patent: Aug. 27, 2019

(54) METHOD FOR INHIBITING MASS CREDENTIAL THEFT

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 16/228,675

(22) Filed: Dec. 20, 2018

(65) Prior Publication Data

US 2019/0188404 A1 Jun. 20, 2019

Related U.S. Application Data

(60) Provisional application No. 62/608,481, filed on Dec. 20, 2017, provisional application No. 62/714,735, filed on Aug. 5, 2018, provisional application No. 62/647,760, filed on Mar. 25, 2018, provisional application No. 62/671,421, filed on May 15, 2018, provisional application No. 62/688,387, filed on Jun. 22, 2018, provisional application No. 62/689,890, filed on Jun. 26, 2018, provisional application No. 62/638,304, filed on Mar. 5, 2018, provisional application No. 62/619,854, filed on Jan. 21, 2018.

(51) Int. Cl.
*G06F 21/62* (2013.01)
*G06K 9/62* (2006.01)
*G06F 21/31* (2013.01)

(52) U.S. Cl.
CPC .......... *G06F 21/6218* (2013.01); *G06F 21/31* (2013.01); *G06K 9/6215* (2013.01)

(58) Field of Classification Search
CPC ...... G06F 21/31; G06F 21/6218–6263; G06K 9/6215; G06Q 20/40; G06Q 20/401–4014; H04L 9/0861–0877; H04L 9/3218–3221; H04L 9/3226–3228; H04L 63/083; H04L 63/0846; H04L 2209/04–046
See application file for complete search history.

(56) References Cited

U.S. PATENT DOCUMENTS

2006/0107323 A1* 5/2006 McLean .................. G06F 21/33
726/23
2009/0310830 A1* 12/2009 Bolle ................. G06K 9/00073
382/124
2014/0380036 A1* 12/2014 Neumann ............. H04L 63/062
713/150

* cited by examiner

*Primary Examiner* — Kevin Bechtel (57) ABSTRACT

Representing personal information and confidential data in a way that allows a data center to authenticate a customer submitting his or her credentials, without having the exact copy of the credentials held by the customer. If the data center is compromised and the customer authentication data is exposed, the data center arms itself with another non-exact copy of the customer authentication data such that only the customer holding the un-compromised data will properly authenticate themselves. A thief, holding the now defunct data center version of the customer authentication data, will not be able to use the stolen customer authentication data to authenticate themselves as the customer.

6 Claims, 1 Drawing Sheet

Recovery of Stolen Credentials (a)

(b)

(c)

(d)

(e)

METHOD FOR INHIBITING MASS CREDENTIAL THEFT

CROSS REFERENCE TO RELATED APPLICATIONS

This application claims as priority date of:
Provisional Application 62/608,481 filed on Dec. 20, 2017
Provisional Application 62/714,735 filed on Aug. 5, 2018
Provisional Application 62/647,760 filed on Mar. 25, 2018
Provisional Application 62/671,421 filed on May 15, 2018
Provisional Application 62/688,387 filed on Jun. 22, 2018
Provisional Application 62/689,890 filed on Jun. 26, 2018
Provisional Application 62/638,304 filed on Mar. 5, 2018
Provisional Application 62/619,854 filed Jan. 21, 2018

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

We witness an unending series of data breaches where the private data of millions of citizens is stolen and used for identity theft and similar crimes. It turns out that a publicly-accessible data base run with a complex array of credential cannot well stand a serious expert well funded penetration attack. In light of this vulnerability one is driven to seek a new avenue of defense. Assuming that attacks are successfully and private data is stolen on a wholesale basis—what can be done to stop the thief from exploiting his theft? If such effort to block the use of stolen data is successful then it would de-incentivize hackers from trying to break in to the next database, and security will be well served.

BRIEF SUMMARY OF THE INVENTION

A method to represent data in a unary way where the bit count of a bit string represents the value of the data, while the identities of the bits represent an identity to that data. This amounts to fingerprinting data and may be used in countless procedures and applications to thwart data theft, identify theft and other cyber security criminal schemes.

By representing data in a unary way, the identity of the bits can be used as a printing pad to stain the data with the identity of its handlers. Passing data will identify its custodians, its pathway, and its bona fide. This technique will allow databases to recover from a massive breach as the thieves will be caught when trying to use this 'sticky data'. Heavily traveled data on networks will accumulate the 'fingerprints' of its holders, to allow for a forensic analysis of fraud attempts, or data abuse. Special applications for the financial industry, and for intellectual property management. Fingerprinting data may be used for new ways to balance between privacy concerns and public statistical interests. This technique might restore the identification power of the US Social Security Number, despite the fact that millions of them have been compromised. Another specific application regards credit card fraud. Once the credit card numbers are 'sticky' they are safe. The most prolific application though, may be in conjunction with digital money technology. The BitMint protocol, for example, establishes its superior security on 'sticky digital coins'. Advanced fingerprinting applications require high quality randomization.

The price paid for the fingerprinting advantage is a larger data footprint—more bits per content. Impacting both storage and transmission. This price is reasonable relative to the gained benefit. What's more the cost of storing and transmitting information is dropping in adherence to Moore's law.

BRIEF EXPLANATION OF DRAWINGS

At some point the database is compromised and hackers get a hold of $D_d$. If they forward it for authentication then the database realizes that there was a break-in because the Hamming distance is not 2 but zero. If so then the database re-expresses the number 8 through a different randomized string $D'_d$ which is set up to have a Hamming distance of 3 from $D_o$: $H(D_o, D'_d)=3$ as shown in section (b) of the graphics. Section (c) shows that the Hamming distance between $D_d$ and $D'_d$ is 5.

The thief, even if he knows that the database was refreshed and even if he also knows that the new Hamming distance is 3, is still not in the know, how to use this information to get verified. At most that he can do is randomly flip 3 bits on the $D_d$ he stole, to get $D_t$ (see section (d)). But when he tries to use $D_t$ to get verified, the database finds a Hamming distance of 6, not 3, see section (e), and catches the fraud.

DETAILED DESCRIPTION OF THE INVENTION

1.0 Introduction

Figure 1:
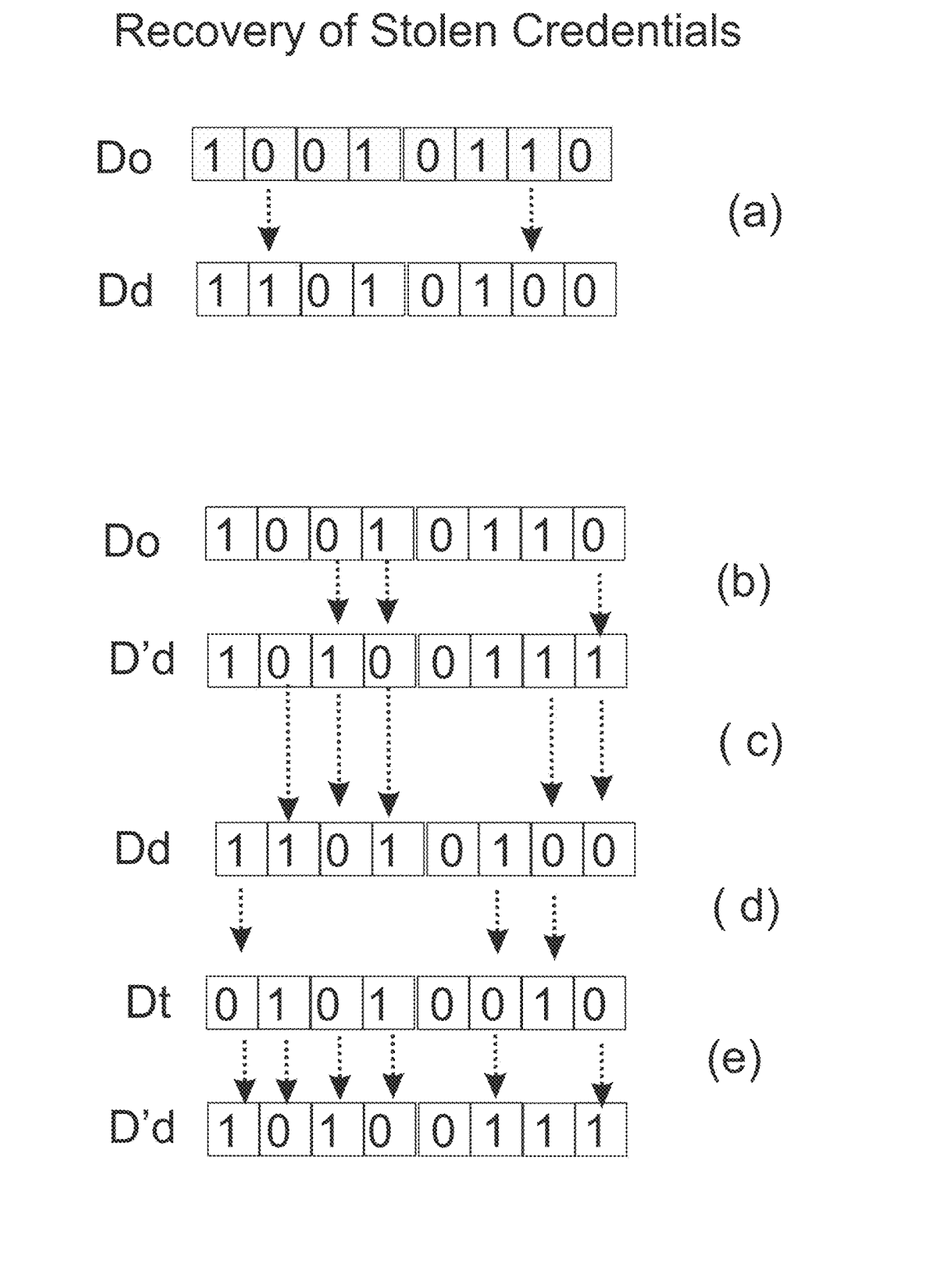
FIG. 1: Recovery of Stolen Credentials: The FIGURE depicts how an integer (8) that represents a digit in some identification string (like name, or account number) is expressed in the unary way ($D_o$) by an 8 bit string where the number of bits (8) expresses the value of the data (8). That expressed ($D_o$) is (i) kept in an off-line file and (ii) is given to the owner of the data that uses this data to authenticate himself. The FIGURE then shows how the database used to verify the credentials of the owner, also carries the number 8, and also in a unary mode (an 8 bits string), but the database string ($D_d$), as shown in section (a), has a Hamming distance of 2 relative to $D_o$: $H(D_o, D_d)=2$. Each time the owner submits $D_o$ to be verified, the database computes the Hamming distance relative to its record. It knows it should be 2, and if so, the claim is verified.

Data normally is 'non-sticky', so its handlers don't leave a fingerprint on it. Data, normally, does not contain the information as to how many readers it had, and rarely who was its writer. This fact is so ruthlessly exploited in cyber crime. We all await the practical manifestation of quantum computing theories which promise to bring 'fingerprinting sensitivity' to data, but until then, and with much more simplicity, we propose here a conventional way to represent data so it is 'sticky'—it bears the finger prints of its writer and readers.

The fundamental principle is simple and straight forward: all data can be expressed as integers, all integers can be represented as a series of bits where the count of bits reflects the data carried by the string. Accordingly all $2^n$ possible n-bits strings will carry the same value, n. The range of $2^n$ possible strings all representing the same value n, may be used as meta data associated with the prime data (n), and this meta data may be regarded as 'fingerprinting' the primary data, n.

Nomenclature. Fingerprinted data will be denoted with a right side underscore:
data_. where:

$$data\_ = value\_identity$$

and write:

$$value = data\_v, identity = data\_i$$

Example: the value x=6, represented as 000001, will be also written as 6_1, and if represented as 011111 will be written as 6_31.

While value ranges from 0 to ∞, identity ranges from 0 to $2^{value} -1$: 0≤value≤∞; 0≤identity≤$2^{value} -1$ We shall use the term 'identity', 'shadow', 'fingerprint' interchangeably.

Data, d, not expressed in the fingerprinting mode will be regarded as 'naked data'. x=12 is naked, x=111000111000 is 'dressed data' or 'fingerprinted data', 'shadowed data', 'identified data'.

Let TM be a Turing machine mapping some input_v to a certain output_v. TM will be associated with a shadow Turing Machine, TM_ which will map the input_i to output_i. TM_ data range is 0 to $2^{output\_v}$, or say: output_i→output_i MOD $2^{output\_v}$.

For example: let TM be: c=a+b, and let TM_ be: c_i=(a_i+b_i) mod $2^{c\_v}$.

Numerically: let a=4_6, and b=7_107, expressed as: a=0110 and b=1101011. We shall compute c_v=a_v+b_v=4+7=11, and compute c_i=a_i+b_i=6+107=108 MOD $2^{11}$, =00001101100. Or say:

$$0110+1101011=00001101100$$

We assume the algorithmic data in the Turing Machines to be naked. So for Turing Machine TM: b=a+5, a and b may be 'shadowed' but the constant '5' will be naked. Hence TM_ may be defined as b_i=(a_i+325+δ)/2, where δ=1 for an even a_i, and δ=0 otherwise. Hence for a=110 (a_v=3, a_i=6), we write: b_v=a_v+5=3+5=8, and b_i=6+325+1=332 mod $2^8$=76. So we write:

$$01001100 = TM(110)$$

Since fingerprinting applies to data, it will not affect algebraic signs, operational marks, or imaginary numbers notation. Say then that x=-4 will be written as -0000, -0001, -0010, ... -1111, and i5, will be written as 100000, i00001, ... i11111.

Irrational numbers cannot be 'fingerprinted' but they are never an output of a Turing Machine. Any rational approximation thereto will be written as a ratio of integers. Thus π may be approximated to 3.14, or 314/100. $2^{0.5}$ may be approximated to 141/100 We assume the algorithmic data in the Turing Machines to be naked. So for Turing Machine TM: b=$(a-7)^{0.5}$, we may define the associated Turing Machine TM_: b_i=$(a\_i)^2$ mod $2^{b-v}$.

Hence for a=11010 (a_v=5, a_i=26), we have b_v=$(a\_v-7)^{0.5}$=i*$2^{0.5}$, where i=$(-1)^{0.5}$. The square root of 2 is computed by a Turing Machine with some finite resolution: $2^{0.5}$=g/h, where g and h are integers. TM_ will determine g_i, and h_i. Say g_i=654321 mod $2^{g\_v}$, and h_i=|a_i-50| mod $2^{h\_v}$. For economy of display we use a low resolution: $2^{0.5}$=1.4=14/10. Namely g_v=14, h_v=10. We have then g_i=654321 mod $2^{14}$=15345, and h_i=|26-50|=24, and thus we write:

$$i*11101111110001/0000011000 = TM(11010)$$

Resolution:

It would appear that the shadow Turing Machines are limited by the MOD limitation, so that when the output of the corresponding Prime Turing Machine is a small integer value x→0, then the scope of the shadow machine, limited to $2^x$ will severely limit its operation. In fact this resolution limitation is readily overcome. For value output x<1, a corresponding fraction x=y/z will allow one to use sufficiently large values so that $2^y$, and $2^z$ will satisfy any desired resolution. For integer output x such that $2^x$ is too small, the shadow Turing machine could use: x=y-z, and, like before use any desired size for y and z. We conclude then that the shadow Turing machines are as general in practice as a general Turing machine.

Multiplication:

The simplest way to adjust resolution is by multiplication. Instead of reading the bit count as the represented data, one can carry the integer n by a bit string comprised of kn bits, k=1,2,... where k is a user's choice allowing for any desired resolution.

Count-to-Value Formula

Mapping bit count (n) to value (v) may be carried out via some choice formula, f: v=f(n). For example: v=kn+b, which will expand on the multiplication option discussed above, and will add a base, b, to insure that the value of zero comes with a sufficient range of shadow values ($2^b$).

Complexity:

A shadow Turing Machine may issue a constant output y_i, regardless of the input data. In this case the shadow Turing Machine (STM) will offer a fixed signature identifying the machine. It can compute its output y_i based on the value x_v of the input, or on the value x_i of the input, or on both parts of the x data.

Basic Machine Tracking:

We consider a Turing Machine $TM_1$ and its shadow $TM_{1\_}$, and another Turing Machine $TM_2$, and its shadow Turing Machine $TM_{2\_}$.

cases:

$$TM_1 = TM_2; TM_{1\_} = TM_{2\_} \qquad \text{Case I:}$$

in which case, upon examination of the input and the output, it will be impossible to determine whether $TM_1$ or $TM_2$ processed the input.

$$TM_1 = TM_2; TM_{1\_} \neq TM_{2\_} \qquad \text{Case II:}$$

In this case, an examination of both the input and the output will expose whether $TM_1$, or $TM_2$ has processed the data. We have here a basic tracking procedure.

$$TM_1 \neq TM_2; TM_{1\_} \neq TM_{2\_} \qquad \text{Case III:}$$

In this case, an examination of both input and output will identify which machine processed the data. However, examination of only the output data might, or might not determine which machine processed the data because there may be one possible input that would fit with the hypothesis that $TM_1$ was working here, and another input corresponding to $TM_2$.

Note: there may be a situation where examination of the input and the output will be inconsistent with either machine processing the data. In this case one will list all the explanations for this and then take steps to resolve the situation. Perhaps the Turing Machine have not been accurately described, perhaps there was a third machine that was not reported that took on the data, etc.

The General Tracking Case:

Given a 'computing environment' comprised of t Turing Machines: $TM_1, TM_2, \ldots TM_t$, and their corresponding shadows: $TM_{1\_}, TM_{2\_}, \ldots TM_{t\_}$, given input x to this environment, and a corresponding output y. We shall define the notion of a 'computing sequence' as a data processing configuration leading from x to y. The configuration will identify input and output for all Turing Machines, any splits of data, and any combinations of data. A data item z may be split as input to two or more Turing Machines, and any Turing Machines may be operating on any number of input data items. We now ask what are the computing sequences that would satisfy this given set of parameters.

[fingerprinting solutions] to satisfy $\{TM_1, TM_2, \ldots TM_t, TM_{1\_TM2\_}, \ldots TM_{t\_}, x\_v, x\_i, y\_v, y\_i\}$ Every computing sequence that satisfies these terms will be regarded as a fingerprinting solution.

There may be no solution to a set of parameters, one solution, or several.

The important observation here is that given a computation environment where there exists more than one computing sequence that would be compatible with a pair of input-output, as analyzed per the prime set of t Turing Machines ($TM_1, TM_2, \ldots TM_t$), with no knowledge of (or non existence) the corresponding t shadow Turing Machines, then this equivocation can be eliminated via a proper set of Shadow Turing Machines that will eliminate all but one computing sequence. This the the fundamental tracking idea of the fingerprinting concept.

The Fundamental Theorem of Data Fingerprinting:

Given a computing environment with t arbitrary Turing Machines, there exists a set to t corresponding Shadow Turing Machines that would eliminate any computing sequence equivocation which may arise, given the first set of t Turing Machines.

Proof:

Consider two computing sequences, each taking a given input x_v to a given output y_v. The last Turing Machine in the first sequence is $TM_1$, and the last Turing Machine in the second sequence is $TM_2$. The first machine is activated with input $x_1\_v$, and the second with input $x_2\_v$. It may be that $x_1\_v = x_2\_v$, or that $x_1\_v \neq x_2\_v$. But their output is the same: $y_1\_i = y_2\_i$. One will then set:

$$y_{1\_i=TM1\_}(x_1\_v, y_1\_v) \neq y_2\_i = TM_{2\_}(x_2\_v, y_2\_v)$$

And thereby will eliminate this equivocation.

This procedure will continue over any two equivocated computing sequences. This may lead to a conflict where some Shadow Turing Machine i, which was adjusted once when it removed equivocation involving Turing Machine 1, has to change again to resolve an equivocation raised with respect to Turing Machine 2. Let the status of TM, have originally been defined as function $f_a$, and to resolve the first conflict it changed to function $f_b$. But $f_b$ is in conflict with another equivocation. This will only mean that $TM_{i\_}$ will have to change to a function $f_c$ which is $f_c \neq f_b$, and $f_c \neq f_a$. To insure that such a third function will be available, one has to insure that the resolution of the shadow functions is sufficiently large. We have seen that resolution can be adapted and increased at will. That means that no matter how many cases of double equivocation will be there, one will be able to construct a shadow Turing Machine that will eliminate all such equivocations.

This universal ability to eliminate any double size equivocation can be applied step by step to eliminate any three-some, four-some or n-some equivocation, which proves the theorem.

Lemma:

It is always possible to construct a set of Shadow Turing Machines that would reduce computing sequence equivocation to any desired degree. Proof: the proof of the fundamental theorem was constructed as elimination of double equivocation one at the time. One could simply stop such elimination when only some k>1 computing sequences remain.

This is quite an intuitive conclusion, which is of theoretical import, but of very little practical significance. From a computer engineering point of view, the question is how easy, how simple, how unburdensome is it to eliminate computing sequence equivocation with a set of Shadow Turing Machines.

The straight forward use of this fingerprinting is deterministic, as will be illustrated ahead. Apart from it, fingerprinting may be applied via randomization and modulation.

1.1 Value-Identity Separation

Obviously a network data flow can be analyzed per the value of the flow items (x_v, y_v), ignoring the shadows. Less obvious is the reverse, where one is tracking the flow through the shadow only, without being aware of the value.

We have indicated the general case where the value of a bit string, y_v, is evaluated via some formula f with the bit count, b as argument: y_v=f(b). If f is unknown, then knowledge of b alone does not indicate the corresponding value. This implies that one could analyze a network data flow by checking value and identity (shadow) simultaneously, or each of them separately.

The significance of this separation is in the fact that very commonly the people focused on the value part of the data are different than the people focusing on the identity part of the data. The value people don't wish to be burdened by the identity info, and those charged with forensic tasks to track data may not need to be exposed to the contents (the value) of the data they are tracking.

2.0 Deterministic Applications

Let us now discuss some practical situations for which fingerprinting may be useful:

Who Done it? Who Read it?
Sequencing
Reconstruction
Fraud Detection
Layered Application:

Data issued by a top source to a client may be used between the client and a secondary agent per the nominal value, and only with the top source per the nominal and shadow value. Thereby the data itself which is shared with several secondary agents may be stolen from one of them, but that would not be enough for the thief to defraud the top source because the thief would not have the shadow information.

2.1 Who Done It? Who Read It?

The simplest and most straightforward application of fingerprinting of data is to associate t value identical Turing Machines, each with a unique shadow Turing Machine. Namely set up a computing environment comprised of t Turing Machines such that:

$$TM_1 = TM_2 = \ldots TM_t$$

and $$TM_{i\_\rightarrow TM j\_} \text{ for } i \neq j, i,j = 1,2, \ldots t$$

For every input x to this computing set, one of the t Turing Machines will compute a corresponding y=f(x), such that $y\_v_1 = y\_i_2 = \ldots y\_v_t$, but $y\_i_k \neq y\_v_j$ for $k \neq j$ for $k,j=1,2,\ldots t$. This configuration will allow one who knows the computing set to determine which of the t Turing Machines processed the input.

In the case where each of the t primary Turing Machines are neutral, this will turn into 'who read it?' case. Namely if for any i=1,2, ... t $y\_v_i = x\_v$, then this configuration will identify which Turing Machine read the input.

It will be easy to adjust the shadow Turing machines to handle the case where a given input x is read by some r≤t Turing Machines, the identity of which is readily ascertained. One simple way to accomplish this is to use any resolution extension discussed above to insure that y_v is comprised of at least to bits: y_v≥nt, of some positive integer n, and define shadow Turing Machine, $TM'_i$ as flipping bits in+1, to in+n. By examining y_i, one will readily determine which are the r Turing Machines that read the input data x.

Illustration let x=110011001100110011001100, Let x_v= (|x|−6)/2=(24−6)/2=9, x_i=13421772. Let the computing environment be comprised of t=3 Turing Machines $TM_1$, $TM_2$, $TM_3$ which are all neutral, namely the corresponding outputs are: $y\_v_1 = y\_v_2 = y\__3 = x\_v = 9$. The corresponding three shadow Turing Machines will be: $TM_1$ =flip bits 1,2, $TM_2$ : flip bits 3,4, and $TM_3$ : flip bits 5,6.

Let's mark the 18 rightmost bits as R, so that we can write x=110011R. If the output will be 000011R. The table below lists all the possible combinations regarding who read the input. If the output is not one of these 8 options then it will indicate some error, or an unidentified reader.

| y | TM-1 | TM-2 | TM-3 |
|---|---|---|---|
| 110011R | | | |
| 000011R | x | | |
| 111111R | | x | |
| 110000R | | | x |
| 001111R | x | x | |
| 000000R | x | | x |
| 111100R | | x | x |
| 001100R | x | x | x |

2.2. Sequencing

A computing environment with t Turing Machines, takes an input x, and have r≤t machines read it, and then output it. One could define shadow Turing machines such that the output will not only identify which machine was exposed to the input but also in which order.

One such configuration is as follows: set $x\_i = \{o\}_n$ (000 . . . 0). $TM_i$ will count i bits in the the rightmost continuous string of zeros, and then flip the next i bits. The result (given that n>t(t+1)) is unique for each sequence.

Illustration: let x='0000000000000000' (x_v=16). Let the reading sequence be $TM_1, TM_2, TM_3$. We will have then: $y\_i_1$=0100000000000000, $y\_i_2$=0100110000000000, $y\_i_3$= 0100110001110000 (the final output).

For a reading sequence $TM_2, TM_3, TM_1$ we have $y\_i_2$=0011000000000000, $y\_i_3$=0011000111000000, $y\_i_1$= 0011000111010000 (the final output).

For a reading sequence $TM_3, TM_1, TM_2$ we have $y\_i_3$= 0001110000000000, $y\_i_1$=0001110100000000, $y\_i_2$=000-1110100110000 (the final output).

It is easy to see that every distinct sequence (complete or partial) will be mapped to a unique shadow value of the output, and therefore ascertained by it.

2.3 Reconstruction

Reconstruction is a more complicated case but related to sequencing. It applies to a computing environment where an output y may have been computed via a relatively large number of pathways, and it its occasionally needed to find the exact path, to particular Turing Machines that worked on the input to generate the output.

One practical situation is when an input x is processed through p rounds of distinct calculations, such that x is computed $x \rightarrow p_1$, and $p_1$ is computed to $p_2$, and in general $p_i \rightarrow p_{i+1}$. and finally $p_{g-1} \rightarrow y$. Each of the g calculations can be done via some q fitting Turing Machines. The selection among them is done based on some criteria, say, load. This configuration creates a pathway space comprised of $q^g$ options. The corresponding Shadow Turing Machines will have to record at least $q^g$ distinct values in order to determine from the output the exact computational history of the output. This of course is very important if one tries to chase a bug, or hunt for malware.

2.4 External Intervention Detection

If the shadow results do not fit any computational path within the computing environment then, apart from some coding error, the suspicion must be raised over the prospect of intrusion, and substitution of a proper Turing Machine with an improper one.

Of course, if a hacker knows the nominal algorithm of the Turing Machine as well as its shadow algorithm then he is left undetected. And that is a good reason to change the shadow algorithms often enough. This should not impact the value calculation and does not have to be evident to anyone except the system operators.

The output of a computing environment, once verified, can be erased, as the data is forwarded to the next computing environment. In other words, it may advisable to separate two consecutive computing environments so that one cannot take the end of the second and learn something about the first.

Exposure:

Nominally the system administrator is supposed to have the full set of Turing Machines in his environment as well the details of the Shadow Turing Machines. However one can deem an architecture where the individual Turing Machines keep the corresponding Shadow machines private. An examiner, holding the output of the computing environment will inquire the last Turing Machine about its Shadow operation, and reverse the output with this information. Then the administrator will inquire about the shadow machine of the previous Turing Machine, and further reverse shadow. This reversal may continue towards the input to the computing environment to verify that the computing path is bona fide. This architecture will allow individual Turing machines to change the shadow machine as often as they please.

3.0 Randomization & Modulation

The purpose of the shadow is to fingerprint data, not to carry specific data values. This important distinction may be readily exploited through randomization.

In a deterministic shadow environment the various computing machines will have to coordinate their shadow operation in order to insure the desired fingerprinting. This may be impractical in environment with a large number of computing machines. By contrast randomization allows for shadow operation without coordination.

Uncoordinated Shadow Machines:

Let a computing environment be comprised of t Turing Machines $TM_1$, $TM_2$, . . . $TM_t$. Let the corresponding shadow machines $TM_{1\_}$, $TM_{2}+$, . . . $TM_{t\_}$ each be fully randomized. Namely given the primary value $y\_v_j$ j=1, 2, . . . t, they will specify the identities of the $|y\_v_j|$ bits in a "purely randomized way" (or close enough to it) and keep a record of $y\_i_j$.

Even if all the t y_v values are identical, for a sufficient bit size of the outputs, the chance for a collision can be set to be negligible. A collision here is a state where two Turing Machines will randomly select the same y_i so that it would not be clear which one of them processed the data. We have here a situation where probability calculus enables a computing environment to work without pre-coordination. Suppose that the bit count of all the y_v values is n=17. Let the computing environment be comprised of t=1000 Turing Machines. The chance for a collision will then be:

$$\Pr[\text{shadow collision}]=1-(1-2^{-n})^n=1-(1-2^{-17})^{1000}=1\%$$

And that probability vanishes for n>17.

Alternatively the machines will use a standard mapping algorithm to create the base shadow for their output, and then randomly flip 50% (or close to it) of these bits. The same calculus applies, the chance for a collision can be made as small as desired.

Consider a reading situation involving t readers (t Turing Machines). Let an input x be distributed linearly among those readers, and the output is x_v=y_v. Using y_i one will be able to identify the exact sequence of readers of this information given that every reader flipped about 50% of the incoming bits. It is straight forward to compute the chance for any pathway equivocation, and reduce it as necessary by increasing the bit count. In particular consider the process of authentication. A network user offers his account number, PIN, or even password to prove her credentials.

A host of powerful applications is being opened by adding modulation on such randomization.

3.1 Modulation

Consider a computing environment comprised of t readers, each applying a randomization strategy for shadow setting. The expected Hamming distance between any two arbitrary outputs $y\_i_k$, $y\_i_j$, is 0.5n, where n is the value of $y\_v_j$ (let's say, they are all the same). Alternatively stated, the probability for a Hamming distance of H much smaller than n/2 is small:

$$\Pr_{collision}[H<<n/2] \to 0 \text{ for for some } t \text{ readers, for } n \to \infty$$

This fact implies that by flipping a sufficiently small number of bits in y_i, one will not harm her ability to track which reader read y_v recently. Such flipping is called modulation.

It implies that a y_i may carry around secondary messages in the form of modulation.

Modulation will allow one to authenticate a prover without having a copy of the authentication data. It offers a capability similar to more common zero-knowledge protocols. Only that it does not resort to the algorithmic complexity used in those protocols (and their vulnerabilities). It is based on simple combinatorics.

3.2 Superposition of Randomization Over Determination

We have seen above that shadow randomization brings to bear specific advantages not present in a deterministic shadow formula. It bring about a much better resistance to hacking, and it open the door for modulation. On the other hand a deterministic shadow sheds light on the inner working of the Turing Machine and allows for advanced forensic and tracking power of a given data flow. It is therefore of some advantage to combine the two varieties. One would associate a given Turing Machine with a deterministic shadow $TM\_$, and then superimposed on it with a randomized operation, marked as $TM\rho\_$. We write:

$$y\_i=TM\rho\_(TM\_(x)) \text{ where } y\_v=TM(x\_v)$$

Accordingly every Turing Machine, TM, will be associated with two shadow machines: one deterministic $TM\_$, and one randomized $TM\rho\_$ Superposition Illustration:

Let a Turing Machine TM be defined as $y=x^2-64$, or say $y\_v=(x\_v)^2-1$.

Let the associated deterministic Turing Machine $TM\_$ be defined as follows: (i) let $y^*=11(x\_i)^2$ Let y'_i={the y_v leftmost bits of y*, for $y\_v \leq y^*$, padding with zeros otherwise}.

Let the associated randomized Turing Machine, $TM\rho\_$ be defined as follows: a seed based randomization apparatus will generate a pseudo-random sequence, R. The generated bits will be taken y_v bits at a time, and associated by order to the bits in y*. This will build a series of y* bits, one after the other. Each bit in y* will be associated with the sum of the corresponding bits in the series of y* randomized bits. This process will stop when one of the bits in y* is associated with a greater sum than all others. The "winning bit" will flipped. This will be repeated q time.

For example, let x=9 written as 100111011, namely x_v=9, and x_i=315.

$TM:y\_v=(x\_v)^2-64=17.$ $TM\_:y^*=11(x\_i)^2=11*315^2=1,091,$
475=10000101001111010011$_{binary}$. And
y'_i=1000 0101 0011 1100 1 (the 17 rightmost bits in y*)

Now we need to superimpose the randomized flipping: activating the randomizer, one gets the following first batch of |y_v|=17 bits: 1100 0001 0101 1111 0. There is no clear winner. So the next batch of 17 random bits is invoked: 0011 0001 1100 1011 1. Adding the bits:

```
1100  0001  0101  1111  0
0011  0001  1100  1011  1
─────────────────────────
1111  0002  1201  2022  1
```

There are four bits scoring 2, no clear winner, so another batch is invoked:

```
1111  0002  1201  2022  1
0011  0011  0111  0100  1
─────────────────────────
1122  0013  1312  2111  1
```

There are 2 bits with a score of 3, so another batch is needed:

```
1122  0013  1312  2111  1
0111  0011  0011  1110  0
─────────────────────────
1233  0024  1323  3221  1
```

This time we have a winner, bit 8, counting from the left has a score of 4, more than all others. So bit 8 in y'_i is flipped. If TMρ_ prescribed only one bit to flip then the final superimposed output is:

$y\_i$=1000 0100 0011 1100 1

In summary: the illustrated node (Turing Machine) accepts: 100111011 as input, and generates: 1000 0100 0011 1100 1 as output.

3.3 Hamming Distance Calculus

Since shadows are intrinsically represented as bit strings, and since randomization technique are based on level of similarity between shadows, it appears natural to recruit the concept of Hamming distance to measure such similarities. Hamming distance defined over two same size bit strings, a and b, is the count of corresponding bits of opposite values. We write H(a,b). Clearly if a=b then H(a,b)=0. if $a \oplus b = \{1\}^{|a|}$, namely all bits are of opposite value then H(a,b)=|a|=|b|. We state here, without proof, the very well known properties of Hamming distance. If a and b are equal size bit string, (n bits each), each randomly selected, from the selection base comprised of $2^n$ strings, then the most likely Hamming distance between them n/2. The likelihood of a Hamming distance is reduced relative to the how far it is from n/2. Let the probability of a Hamming distance $h_1$ between two arbitrary even size strings be $Pr_1=Pr[H(a,b)=h_1]$. Then we can write:

If $|H_1-n/2|<|H_2-n/2|$ then $Pr_1>Pr_2$. For sufficient size n the probability of a Hamming distance approaches zero for $|H-n/2| \rightarrow n/2$.

Lim $Pr[H(a,b)||H(a,b)-n/2|\rightarrow n/2]=0$ for $n \rightarrow \infty$

This is the mathematical basis for randomization fingerprinting and modulation. Some t Turing Machines, each randomly selects a value X_i corresponding to a given X_v will yield t bits strings of size n=x_v, and with a a set of t(t-1)/2 Hamming distances all approaching n/2=X_v/2. Modulation is based on the notion that given t n-bits size strings randomly generated, where $t \ll 2^n$, then if a small number of bits in one of these t strings, string Z is flipped, then its distance to the unflipped string will be much smaller than its distance to all other (t-1) strings, and owing to this distance situation one will identify the flipped string as a modulation of the unflipped string Z.

4.0 Randomization Applications

We consider the following randomization applications:
FlipGuard: Database Protection
Establishing means to void exploitation of a successful compromise of a database Pathway Tracking
Forensic-Friendly network data propagation
Trust Cascade Tracking data in a hierarchy (tree) network.
Extending trust from a primary to a secondary source.
Tokenization
The ever increasing range of applications for tokenization may all benefit from fingerprinting
Preventing Abuse of Stolen Credentials
using fingerprinting to authenticate claimants without using their exact identity claiming data.

4.1 FlipGuard: Database Protection

Databases holding private data of many users are a natural hacking target. Especially because users use the same private data in many databases. So a hacker can compromise the least protected database, and use the stolen data to fake credentials in many other databases. In the scope of so many databases today, there are bound to be some that are poorly protected and end up compromised.

By applying the fingerprinting technique, it is possible to distinguish between private users' data held by the user, and the same data held by the database. Such that if a database is compromised, and a hacker turns around to use the stolen data to falsely claim credentials then, not only would he not be admitted, but the database will readily realize that the submitted data marked with the database fingerprinting is evidence of the database being compromised. The latter is quite important because successful hackers hide their success for many months at times.

Here is how to carry out this fingerprinting protection of a database.

We consider a database serving a large number of users. The database holds private information for each user. Let X represent such private information of an arbitrary user of an arbitrary database. Let x be fingerprinted so that:

$$X_{u\_}v = X_{b\_}v$$

and $$X_{u\_}i \ne X_{b\_}i$$

where $X_b$, and $X_u$ are the values of X held by the database and the user respectively. The non-equality between $X_u\_i$ and $X_b\_i$ is due to modulation.

This arrangement will allow the database to recognize an access applicant purporting to be the user with the X credentials. The recognition will be due to a minor difference in the bit compositions of the two values, consistent with the applied modulation. However, if the source of the credentials (X) is a successful hacking of the database, then the database will find: $X_u\_i = X_b\_i$, (no modulation present), and will be alert to this fact.

Of course, if a hacker compromised the user he would be able to pose as the bona fide user, using the user's fingerprint: $X_u\_i$, and be admitted. This FingerPrinting technique (code named FlipGuard) is designed solely to protect against a "wholesale" hacking risk, compromising the database. It provides no protection against "retail" hack, one user at a time.

This is the basic idea, which has to be well built to make it stick. We call it the randomization fingerprinting protection level 0. An ignorant database hacker, unaware of the fingerprinting will be readily caught. Albeit, it is unrealistic to assume that this technique can be applied in secret. One must assume that a hacker smart enough to break into a database will be smart enough to realize that fingerprinting is in force, and strive to break it too.

We shall therefore proceed with describing how to implement database protection against a the smartest hacker we can imagine. Before that we will describe hierarchical application of the database fingerprinting technique.

4.1.1 Hierarchical Fingerprinting

We consider a 'top database, B, and a secondary database B'. There are individuals who are logged as users both in B and in B'. A typical such user will use some private data X in both databases. For example: name, social security number, address, salary information, professional credentials, etc.

We assume that the top database, also called the issuer database, is practicing fingerprinting operation with its user, hence each user has its X data marked as X_v and X_i.

The issuer, B, can share its own version for each X ($X\&b\_v$, $X_b\_i$) with the secondary database, B', namely:

$$X_b\_V = X_{b'}\_v$$

$$X_b\_i = X_{b'}\_i$$

(b, and b' indices indicate the issuer database and the secondary database respectively). And in that case the secondary database will function with the same protection as the issuer database. This solution can be extended to any number m of secondary databases $B'_1, B'_2, \ldots B'_m$. The problem with this solution is that (i) if a compromise is detected, it is not clear which of the (m+1) databases was hacked, and (ii) the security of the most secure database is reduced to the security of the least secure database in the list.

An alternative strategy would be for the issuer database to pass on to the secondary database, a different shadow:

$$X_b\_v = X_{b'}\_v$$

$$X_u\_i \neq X_{b'}\_i \neq X_b\_i$$

And if there are several secondary databases, then each will be given a unique shadow. All the shadows will be randomized so that they would be able to admit a user while being immunized against a breach into their database. And should any database in the strategy become compromised, then upon any attempt to use the compromised X data, the system will spot it, and recognize which database was breached.

4.1.2 Advanced FingerPrinting Protocol

We consider a smart attacker who knows everything about the defense strategy except the actual values of the protected data. Such an attacker is assumed to have compromised the database. The attacker would know that the database shadow data is different than the user's shadow data and if he would try to log in, using the compromised X values, as copied from the database, then the database will not only not admit him, but will be alerted to the fact that the database was compromised. The attacker would further know that the database does not have the exact user shadow. It only knows that the user's shadow is similar to the database shadow. So all that the hacker has to do is to randomly affect some small changes in the stolen shadow data, and forward the altered data to gain access, and pass as the bona fide owner of that X data.

If the changes induced by the attacker are such that the database would consider the difference between the attacker offered data, and the database respective data, as 'normal, or 'acceptable' then the decision would be to admit the hacker, and the protection would fail. Note: similarity between strings is measured through the Hamming distance between them.

To counter this eventuality one could opt for a countermeasure strategy based on "off line repository". The idea here is make an exact copy of the user shadow ($X_u\_i$), and remove this copy from the active database, safekeeping it on an external system where it will have to be handled manually, locally, totally un-accessible to any online command. When a hacker forwards stolen X data, reasonably modified, then the hacker will be admitted, but the database will retain a copy of the X_i that was used to attain access, and every so often the database will take all the admitted users and compare their admission string to the one manually extracted from the off line repository. This comparison will readily reveal that the database was fooled by a hacker and would further disclose that the database was in effect compromised. That is because it is highly unlikely that the fraudster would have guessed a string of sufficient size n such that its Hamming distance from the copy held by the database would be so small.

This counter measure, designated as fingerprinting randomization level 1, will alert a database on a breach as often as the off-line repository is consulted, which may be too infrequent.

The defender would improve on this strategy by resorting to the services of an oracle.

Oracle Defense:

The modulation of the shadow given to the user ($X_u\_i$) to generate the database version ($X_b\_i$), may be carried out by always flipping a fixed δ count of bits. Alas, the value of δ will eventually leak, and a hacker who stole the X_i value from the database will eventually discover δ, and will flip exactly δ bits in the compromised value $X_b\_i$ and use this flipped string to request access.

The database on its part will verify that the Hamming distance is in good order:

$$H(X_b\_i, X_a\_i) = \delta$$

and will admit the hacker. The index 'a' indicate an attacker, a "would be" user.

Similar vulnerability will apply for any pattern established δ. The only way to insure that no δ pattern will leak is to insure that it is pattern-less, random. To put this into effect the database will have to keep somewhere the values of δ randomly selected for each $X_u\_i$ value.

The problem with this solution is that the database file which guards the δ values, may itself be compromised, like the rest of the database, and the vulnerability is no much alleviated.

To help out with this challenge the database will use a specifically designed oracle.

An oracle is a restricted access database that houses the records an identification code for each user's value X and the corresponding δ values. (This id may be X_v). Unlike a regular database, the oracle accept only one type of query, to which it responds with a binary answer. The question is as follows: for a particular X value is the Hamming distance between the database version and the user version exactly δ? If the Hamming distance is correct (=δ) then the answer is in the affirmative, negative otherwise.

So the query relates to some data element X and is in the form:

Is it true that $H(X_u\_i, X_b\_i) = \delta$

The oracle does not release the right δ value if the answer is negative. And this is its main attribute. The oracle will keep track as to whether a particular X value is being queried too many times. This situation will serve as an alert for a breach.

Using the oracle the database will randomly select δ values to various X_i values, push these values to the oracle. And when a candidate for admission offers $X_a$ as his credentials, the database will compute its Hamming distance relative to the database value. If the Hamming distance is close to n/2 (half the size of X_i) then the database will conclude that the applicant is a low-grade attacker, and clearly not the right owner of X. However, if the Hamming distance $H(X_a\_i, X_b\_i)=\delta$, for some reasonably small δ, then the database will forward the identity of X and the computed δ value to the oracle. If the oracle answers in the affirmative then the database will conclude that the access applicant is bona fide. If the answer is negative then the database will conclude that a breach might have occurred and activate the breach suspicion response. A single, or few negative answers from the oracle may be due to the applicant being the rightful user, for some reason has flipped a bit or two in his data. If a breach has really happened that one would expect an avalanche of negative answers from the Oracle.

Because the determination of δ for each X value is randomized, there is no way for a hacker to find a pattern in it. The guessing ability of δ is well managed. The user will set a low and high limits for δ ($\delta_l$, and $\delta_h$), and use a randomness source to pick a δ value such that: $\delta_l \leq \delta \leq \delta_h$. The chance for any δ value to be picked is $1/(\delta_h-\delta_l)$, and fully determined by the user.

Oracle Illustration:

A database B assigns a two-digits identification code to user Alice: 72, and to user Charlie: 58. We say then $X_{u=alice}\_v=72$, and $X_{u=Charlie}\_v=58$. The database uses randomization to fix the corresponding shadows:

$X_{u=Alice}\_i$=1001000100100100011011101001010
1111001010100001100111101101111111110
0110$X_{u=Charlie}\_i$=00001001011101110011000
0010101011010010111010001101111001101

Alice will receive her $X_u$ and Charlie will receive his $X_u$. These values will be copied to an off-line repository. Next the data base will set the following limits $\delta_l=2$, and $\delta_h=8$. Using a good randomization source the database will determine $\delta_a=5$, and $\delta_c=3$. Next the database will use a good randomization source to randomly pick 5 bits to flip in $X_{u=Alice}\_i$, and randomly pick 3 bits to flip in $X_{u=Charlie}\_u$:

$X_{b=Alice}\_i$=100100011 01001000110101010010100
01111001010100001100111101101111111110010
0$X_{b=Charlie}\_i$=001 010010111011100101
0001010101101001011101000010111001101

The two flipped strings are posted in the user admission database, and the database sends to the Oracle the following:

δ(Alice)=5;δ(Charlie)=3

The system is now operational. If Alice wishes to log in, she forwards her X value:

$X_{u=Alice}\_i$=10010001001001000110111101100
10101111001010100001100111101101
111111111001 10

The database compares Alice's submission to its record:

$X_{b=Alice}\_i$=100100011 0100100011010101
00100 01111001010100001100111101
10110 1111110010 0

And identifies a Hamming distance of of $h_a$=5. The database then forwards a query to the oracle: is the δ (Alice)=5? The oracle replies with the affirmative, and the database admits Alice for service. Similarly for Charlie.

Let's now assume that a smart hacker penetrated the database, and is now in possession of Alice admission credentials:

$X_{b=Alice}\_i$=100100011 0100100011010101
00100 01111001010100001100111101
10110 1111110010 0

The hacker may not be aware of the fingerprinting defense offered by the database, and use the stolen value as is, in his attempt to get in with Alice's credentials. In that case the database will realize that the Hamming distance between its record and the submitted record is zero—and will readily conclude that this submission is likely a result of a data breach.

A smarter hacker might be aware of the modulation defense. She might even be aware somehow of the limits: $\delta_l=2$ and $\delta_h=8$. She will then have to choose between 2,3,4,5,6,7,8, facing a 86% chance of picking the wrong δ value, which will not only bar her from access, but will trigger the alarm for the fact that the database was compromised. Even if she gambles, and gets it right this time, she is likely to trigger the alarm the next time or there after.

In all likelihood the smart hacker will not risk triggering the system. In fact she will never again spend all that excruciating effort penetrating a fingerprint-protected database, what's the point? That's exactly the point for the defense.

Note: of course the values here are small, for demonstration purpose only.

4.2.3 BitMint Oracle:

The Oracle strategy is a perfect fit for the BitMint currency (see US PTO #8,229,859). BitMint money is a randomly generated bit string. The string is issued to its buyer against the currency or the commodity which the bit money represents. The string can be chopped to pieces, and the value of each piece is determined by its bit count. Substrings may travel among traders, until at some point they are submitted for redemption. The BitMint database will compare the bits identity of the submitted money string to the corresponding string in its database. Without the use of fingerprinting, the submitted digital coin will be redeemed if all the bits fit.

This mode of operation leaves the entire BitMint money in circulation at the risk of a successful breach where an accurate image of all the BitMint money traded outside will the compromised and allow thieves to redeem all that money.

This is a risk too much, and the fingerprinting defense is called for. Accordingly, an accurate image of the randomized money will be copied to an offline repository, and a randomized process will flip a relatively small number of bits in the issued money to created a flipped string image of the money, which will serve as the redemption and validation reference. The number of flipped bits will be randomized between two preset values (high and low). That number (of flipped bits) will be submitted to the BitMint oracle. When the issued digital money in whole or in part is submitted for redemption the database will compare the submission to the database reference string. If the strings are vastly different (Hamming distance close enough to 50% of string length), then the submitted string will be considered a 'dumb fraud'—an attempt to defraud BitMint by guessing the bit identity of the redeemed money. It is called 'dumb' because the BitMint design is such that the chance to guess right the identity of the redeemed bits is negligibly small.

If, on the other hand, the submitted string is exactly the image of the reference string then it is clear that its source is not the coin itself but the database. Either an external hacker managed to penetrate the BitMint database, or an internal "rotten apple" pilfered the data, or some combination. But at any rate a match between the submitted string and the reference string should trigger the preset response operation which in all likelihood will call for retrieval of the true coin images from the offline repository and to restart again the fingerprinting protocol above.

If a submitted string and the reference string show a small enough Hamming distance between them, then this submission looks positive. But still it would not be ready for redemption. The reason is that a smart hacker who got the data from the breached BitMint database would cleverly flip a few bits to fool the BitMint database that it is a bona fide money string, counting on the fact that the database does not know exactly the image of the stolen coin. It is then when the oracle comes into play. The BitMint database would invoke the oracle with a question identifying the label, identity of the coin, and then informing the oracle how many bits were found flipped. The oracle will consult its database and answer yes or no. If the answer is yes, then the coin will be redeemed, if the answer is no then the alarm will be sounded off and a 'smart fraud' will be declared. The conclusion would be that a smart hacker breached the BitMint database, and then gambled on the number of bits to be flipped in an attempt to get the money redeemed.

This alarm will lead to further careful examination. The reason being is that a valid coin holder may attempt to throw off the BitMint database, and purposefully flip a random small number of bits. The money would be rejected and BitMint will be thrown into an expensive response protocol. Only when a sufficient number of such wrong number of flipped bits is recorded, the BitMint mint will reach the conclusion that it was penetrated and must be restarted.

In the event of a breach the true images will be raised from the offline repository and the fingerprinting procedure will be replayed afresh.

Because the BitMint coin may be split to substrings it is necessary to provide a more detailed flipping strategy.

BitMint Security Flipping Strategy:

BitMint money strings may be redeemed one substring at a time. It may happen then that a coin substring will be such that no flipped bit appears in it. In that case there may be a false alarm per breach. The BitMint database will be aware of this situation and therefore might keep score of flipped bits found in redeemed substrings until the entire coin is redeemed, and when so, will tally all the flipped bits and inquire with the oracle if this is the right number. If any suspicion arises, the coin can be marked for retrieval from the off line repository for evaluation. Of course such effort will be carried out over large denominations.

Alternatively BitMint will regulate the minimum redemption bit count, e. Which means that no BitMint coin comprised of less than e bits may be individually redeemed. The monetary value per bit may vary. The security depends on bit count, The size of e might be designed to allow for a minimum random flipped bits per minimum retention stretch: e. So a coin of size n bits will be seen as comprised of g substrings where g=n/e, and each such substring will have f of its bits flipped. f will be stored in the oracle per e, and will be queried. Alternatively each e-size substring will be associated with its own flip-count value, f, and all these f values will be forwarded to the oracle, so that the oracle will be queried in e size units specifically identified.

This e-scope bit flipping strategy takes care of the problem identified above.

Illustration: a BitMint coin comprised of n=10,000 bits is worth $1,000. Its redemption unit size, e is set out to be 100 bits. Namely each redemption unit is worth $10.00. The mint's rules are that $10.00 is the redemption resolution; one can redeem $10, $20, . . . . The mint will randomly pick $f_e=7$, namely in each redemption unit 7 bits will be randomly selected then flipped. The number $f_e=7$ is forwarded to the oracle. It will be used to decide whether a coin submitted for redemption is valid.

4.2 Pathway Tracking

We consider a computing environment comprised of a large number of (t) Turing Machines, or say a large network with many nodes, and a complex stream of data. Some data is split to many nodes, several data items are combined to a single computed output, etc.

By construction every node is equipped with an effective random number generator, (eRNG), and a seed-based pseudo-random number generator ($PRNG_{seed}$). A seed based PRNG is generating random-like bits based on a value of a seed, and repeat the same pseudo-random bits each time the same seed is applied. This contraption is also known as an oracle).

Using the eRNG each node will, choose 'seeds' (a small bit string), and activate it. Then it will reinvoke the eRNG to choose a random time to randomly select a new seed. The node will keep a track for some prescribed time of the past (say 24 hours) of the seeds: $seed_1$, $seed_2$, . . . and the corresponding time point when they became effective: $\theta_1$, $\theta_2$, . . . . As in similar settings, the randomization process removes the need for coordination. For a seed space large enough, a given set of t nodes has negligible risk of collision—sharing the same randomization formula. Also randomization makes it impossible for a hacker to steal the randomization formula in advance. We therefore build here a network of t nodes (or say, t Turing Machines) each holds a unique (though dynamic) formula to 'color a shadow', namely to change a given shadow ($X_{input\_}i$) to a different shadow ($X_{output\_}i$) for some piece of data of a fixed primary value X_v.

This construction may be used in different ways. We briefly discuss here:

fixed stamp
progressive stamp 4.2.1 Fixed Stamp Pathway

A data element X is given to or is generated by a node in a network. X is then passed around among nodes in the network. It keeps its value X_v, but each node changes its image X_i according to its randomization process. After some q nodes, the node ends in the hands of a given node, which then submits X for inspection.

The inspector will know the starting value $X_0$ i and the terminal value $X_q$ i. In addition the inspector will know the image generating formula (the bit flipping formula) of each node in the network (the formula may be dynamic, and change over time). The total data that is being passed around may include the chain of custody: which node passed the data element to which node. In that case the inspector will be able to verify the chain of custody list with the chain of bit flipping over X_i. Every inconsistency will draw further attention.

In the case where the explicit custody list is not carried with the X package, there may be a a per node list as to which node pushed it to it, and which node it went further. In that case also consistency will be evaluated.

A third option is for the inspector to have only the starting and the terminating shadows, and the image generating formula for each node. Then it becomes a solution seeking situation. With these given terms there may be many solutions—namely many chain of custody pathways, or there may be only one solution. Alternatively, there is no solution at all. The shadow generating formulas may be adjusted such that the probability for more than the one actual pathway of custody will be negligible. This means that the starting shadow and the terminating shadow plus the shadow generating formulas together betray the single and only chain of custody over X. Conversely, any attempt to tamper with the images along the way will be readily exposed. One may plan for X_v, and the average flip-ratio to be such that the terminal shadows point to the single possible pathway.

4.2.2 Progressive Stamp Pathway

Relative to the fixed stamp pathway discussed above. One could set up a configuration where nodes add their id ([node identity]$_i$) for i=1,2, . . . t one next to the other. But they do so after first applying their unique (randomized) shadow generating formula over the running bit sequence of the identification strings of the previous custodians of the transferred about piece of data.

This progressive shadow generation locks the line of custody against possibilities of subsequent falsification. This has a similar function to the progressive hashing used in bitcoin and other crypto currencies. The advantage here is that it does not depend on complex math which may be breached, it is very much faster, and its risk of cracking may be credibly appraised.

Illustration:

A network includes three nodes: Alice, Charlie and David. Each has a numeric id: Alice: 5, Charlie: 7, David: 4. A data element X is passed from the outside to Alice. X_v=10, X_i='1000101011'=555$_{decimal}$. Alices wishes to pass X to Charlie but first putting her stamp on the data package to bear witness to her custody of X. To do that she first stamps the package so far (X) with her randomization formula, which is to flip every second bit. So Alice turn X_i to X$_a$_i='1101111110', she then add her id: A: A_v=5, A_i='00110' to create the package:

$$=X_a\_i=X_a\_i\|A\_i='1101111110\ 00110'$$

Y$_a$ is passed to Charlie. After a while Charlie wishes to pass the package to David. To do that Charlie first uses his valid randomization formula, which is to replace every '01' with '10'. It changes the package to be: (Y$_a$_i)$_c$='1110111110 01010' to which he adds his id: C_v=7; C_i='0111000' to generate:

$$Y_{ac}\_i=(Y_a\_i)_c\|C\_i='1110111110\ 01010\ 0111000'$$

David, receives Y$_{ab}$_i, leaves his randomized stamp and adds his id before releasing the package outside the network. David's randomization formula is to square the package (Y_i)$^2$, and take the Y_v leftmost bits from it. David receives Y$_{ac}$='1110111110 01010 0111000'= 3925-304$_{decimal}$, squared to: 15408011492416$_{decimal}$, or in binary: 11100000001101110101000011010011110001000000, of which leftmost Y$_{ac}$_v=10+5+7=22 bits are: (Y$_{ac}$)$_d$=11100 00000 11011 1010100 to which David adds his id: D_v=4; D_i=1110, and sends out the package:

$$Y_{acd}=11100\ 00000\ 11011\ 1010100\ 1110$$

which bears witness to the path that the X package took inside the network. Given the entry data X and the exit data Y$_{acd}$, there is only one pathway that would reconcile these two terminal datapoints.

One may note that Alice's 'stamp' is based on bit position. If all stamps were like that then the terminal data points would only identify the list of X custodians, not the order of custody. However the randomization formulas used by Charlie and David are driven by bit-identity, and hence nail down the sequence of custody. Also, Alice's and Charlie randomization formulas are reversible, namely one could get the output and reverse-compute to the input, while Charlie's stamp is irreversible because it calls for taking a substring of a mid-process string, which means that the cut off is not preserved. For various circumstances different randomization formulas are best.

4.3 Trust Cascade: Tracking Data in a Hierarchy (Tree) Network

We consider a case where a primary database, p$_0$ issues fingerprinted private data to its users. This community of users also wishes to use the same private data to gain access and trade with some m secondary databases: p$_1$, p$_2$, . . . p$_m$. We now outline how to extend the fingerprint protection through the various databases.

As far as the primary database p$_0$ is concerned the operation is as discussed above. In addition the primary database will prepare a unique reference database to each and every secondary database. The m secondary data packages per users will be unique because the data in each will be uniquely flipped relative to the pre-flipped string given to the user. The primary database will build an oracle for each of the secondary databases and feed each oracle with the flip count data per each fingerprinted data item in each data package for each secondary database. The recipient secondary databases will be notified of the high and low limits for the flip count, namely the $\delta_l$ and $\delta_h$ specified for it. Each secondary database would not know the exact number of flipped bits (flip count), f ($\delta$). It would only know that for each data item it received from the primary database, there are some f (=$\delta$) bits flipped where $\delta_l \leq f = \delta \leq \delta_h$.

Each secondary database will use the package it received from the primary database to admit users based on their fingerprinted data. To do this each database will compare the fingerprinted data submitted by the user to the corresponding string in its database. If the Hamming distance between these two strings is close enough to half the size of the strings, then this would be classified as a 'dumb fraud' and readily rejected. If the Hamming distance between these two strings, h, is sufficiently small but is not within the range $\delta_l$-$\delta_h$, then it suggests that some database in the array of (m+1) databases has been breached. If H is within the limit: $\delta_l \leq H \leq \delta_h$, then the access requesting user is considered bona fide.

This solution has the vulnerability of having the limits values $\delta_l$, $\delta_h$, compromised which will allow a smart fraud attempt: namely to apply a flip count on the pilfered data to fit between the two limit values.

This vulnerability can be addressed by having each secondary database apply its own round of bit flipping. Any secondary database can randomly pick a flit-count, f, for each data element, and randomly flip f bits in the already flipped string given to it by the primary database. The secondary database will construct its own oracle and deposit there the f value. Now the secondary database will hold a reference string where some f bits are flipped (by the primary database) compared to the string held by the user, and then some f bits more are flipped by the second database (in total this may be less than f+f because by chance the secondary database could have flipped back a bit which was previously flipped by the primary database).

The only problem is that the secondary database does not know f only the limits for f ($\delta_l \leq f \leq \delta_h$). That means that as far as the secondary database is concerned it knows that the Hamming distance between the string forwarded by the user (access applicant) and the reference string hold by that database, $H_s$, is limited between: $\delta_l - f' \le H_s \le \delta_h + f'$ If the Hamming distance is outside these limits then it is suspected to be stolen data. The secondary database constructs its own oracle, and deposits there for each data item, the three values: $\delta_l$, $f'$, $\delta_h$. Each time a user-application forwards a piece of data X with an attempt to be authenticated by the secondary database, the secondary database will measure the Hamming distance, h between the applicant's version of that data item ($X_a\_i$), and the version of the same, as stored in the secondary database: $X_{b'}\_i$: $H=H(X_a\_i, X_{b'}\_i)$. Then this secondary database will approach its oracle with a question:

Is $\delta_l - f' \le H(X_a\_i, X_{b'}\_i) \le \delta_h + f'$?

If the answer is positive, then the applicant is admitted. Otherwise a breach is suspected.

This test is based on an interval for the Hamming distance rather than on an exact value as the case is with the primary database, so it is not so tight, but with a clear added value.

This procedure extends the oracle trust from a primary source to a secondary one. It alerts the community of databases of a compromise of any of them. This method to extend trust may be offered in parallel to any number of secondary databases. It also can be extended from a secondary database to a tertiary database, and then further down to lower echelon databases.

This cascade trust extension is designed to offer the higher echelon database protection against corruption in the lower echelon database. The extending trust database conveys to the extended (receiving) database only a flipping range, not an exact flip count and with it it protects itself from a 'rotten apple' within the secondary database.

Below we also analyze whether a group of p secondary databases may collude to breach the primary database. We also offer an illustration.

It is important to note that only the primary database holds the ultimate arbitrator of the shadow—the off-line repository.

4.3.1 Secondary Database Collusion

A primary database $P_o$, extends an oracle based trust to m secondary databases $p_1, p_2, \ldots p_m$. Each secondary database $p_i$ receives, for every shared data element, X, the low and high limits of the flip count: $\delta_{li}, \delta_{hi}$ for $i=1,2, \ldots$ m Given what each secondary database knows, it would be impossible for it, or for any one exposed to its secrets, to defraud the primary database because the exact flip-count, $f_i$ for $p_i$ is not known to $p_i$. Trying to access the primary database with a wrong flip count will expose the fraud.

The question of interest is whether a group of secondary databases can pool their respective information in order to defraud the primary database. We begin by analyzing the simple case where two secondary databases $p_k$ and $p_j$, try to pool their information in order to defraud the primary database. With respect to a particular data item, X, $p_k$ is given $\delta_{lk}$, and $\delta_{hi}$, and $p_j$ is given: $\delta_{lj}$, and $\delta_{hk}$. The two colluding databases can check their relative Hamming distance with respect to X: $H(k,j)=H(X_k\_i, X_j\_i)$.

In order to defraud the primary database the colluding databases will have to find either one of their respective flip count: $f_k$, and $f_j$. They can establish a double inequality between these values and the recorded relative Hamming distance between them:

$|f_k - f_j| \le H(k,j) \le f_k + f_j$

And:

$\delta_{lk} - \delta_{hj} \le H(k,j) \le \delta_{hk} + \delta_{hj}$

And the symmetric inequality:

$\delta_{lj} - \delta_{hk} \le H(i,j) \le \delta_{hk} + \delta_{hj}$

These inequalities will limit the 'guess range' for the fraudsters trying to guess $f_1$ and $f_2$. However, the primary database has full control over the flip counts and the high and low limits it communicates to the secondary databases, and thus it will be able to credibly estimate its risk for a colluding pair of secondary databases to successfully guess a flip count of one of them.

This case of two colluding secondary databases is readily extended to any number of colluding databases. The more inequalities that can be written the narrower the guessing range for the fraudsters and the greater the risk for the primary database to be compromised. Alas, again, as before, this risk is accurately quantified based on the actual values of the flip limits and the actual flip counts selected by the primary database for its secondary databases.

Illustration of Database Collusion:

Let the user shadow be determined by a primary database: $X_u\_v=30$, and $X_u\_i=718214899_{decimal}=$ $1010101100111$-$10001011011110011_{binary}$. The primary database randomly picked a flip count of $f_1=4$ for secondary database Number 1, and $f_2=7$ for secondary database Number 2. The primary database ($p_0$) further informs the first secondary database, $p_1$ that the flip limits are $\delta_{l1}=2, \delta_{h1}=8$, and similarly, it informed the other secondary database, $p_2$: $\delta_{l2}=3, \delta_{h2}=11$ The two secondary databases decide to collude in order to defraud the primary database. For that purpose they have evaluated the Hamming distance, hie between their versions of the X_i value:

$H_{12}=H(X_{b1}\_i, X_{b2}\_i)$

They try to find out the user holding value $X_u\_i$. The secondary databases don't know the values of $f_1$ and $f_2$—the flip-count for each of them, but they can write:

$f_1 + f_2 - f_{12} = h_{12}$ where $f_{12}$ is the number of coinciding flip-bits. They have to be accounted for because any bit that is flipped for both secondary databases will remain unflipped. The secondary databases also know the following:

$\delta_{l1} + \delta_{l2} \le f_1 + f_2 \le \delta_{h1} + \delta_{h2}$ $\min(\delta_{l1}, \delta_{l2}) \le f_{12} \le \min(\delta_{h1}, \delta_{h2})$ These restrictions narrow the field of possible values for $f_1$ and $f_2$. The following table shows the valid combinations for $f_1$ and $f_2$ per the information known to the secondary databases. The numbers inside the matrix indicate the corresponding value of $f_{12}$:

| f1\f2 | 3 | 4 | 5 | 6 | 7 | 8 | 9 | 10 | 11 |
|---|---|---|---|---|---|---|---|---|---|
| 2 |   |   |   |   |   |   | 0 | 1 | 2 |
| 3 |   |   |   |   |   | 0 | 1 | 2 | 3 |
| 4 |   |   |   |   | 0 | 1 | 2 | 3 | 4 |
| 5 |   |   |   | 0 | 1 | 2 | 3 | 4 | 5 |
| 6 |   |   | 0 | 1 | 2 | 3 | 4 | 5 | 6 |
| 7 |   | 0 | 1 | 2 | 3 | 4 | 5 | 6 | 7 |
| 8 | 0 | 1 | 2 | 3 | 4 | 5 | 6 | 7 | 8 |

The table shows that there are 28 valid combinations. They are not of equal likelihood because the chance for a coinciding flip bit depends on the value of X_v, and/or whether the primary database on purpose introduced one more coinciding bits. What is important here is that the databases themselves can credibly analyze the risk of a good guess by colluding secondary databases, whether two or more.

One may note that while the colluding databases may guess well once or twice, as they keep exploiting their collusion they are bound to trip the alarm after a few successful hacks.

Trust Extension Illustration:

A primary database, B, issues a user a private data X, where $X_{u\_}v=24$, and $X_{u\_}i=11322960_{decimal}=$ 1010110-01100011001010000$_{binary}$. The primary database copies $X_{u\_}i$ to the offline repository. The database then sets low and high limits for the flip count: $\delta_l=3$, and $\delta_h=9$. This defines a range of 6 options for the flip count f: $3 \le f \le 9$. The database then randomly selects f=4, and then again, randomly selects four bits in $X_{u\_}i$ to be flipped:

$X_b\_i$=100 010 00111 00110010101 00

The database then passes the f=4 value to the oracle. Each time the user forwards X to the database, the database evaluates the Hamming distance $H(X_{u\_}i, X_{b\_}i)=4$. It queries the Oracle to find out if the flip count is indeed four, and is satisfied with the answer.

Now the primary database wishes to pass the X value to a secondary database, B'. To do that it applies a different flip pattern to $X_{u\_}i$, say within the same flip range (3-9). This time the choice is f'=7. So the primary database generates the shadow version to be passed to the secondary database:

$X_{b'}\_i$=0 011 1101 1101 010 000 01001 0

The primary database also passes the limits: $\delta_l=3$, $\delta_h=9$. But it does not pass the actual flip count (f'=7) that generated $X_{b'}\_i$.

The secondary database now selects a random flip count f''=2, and applies it to the shadow given to it by the primary database ($X_{b'}\_i$), to generate the value it keeps in its database: $X_{b''}\_h$.

$X_{b''}\_i$=0 0011 1101 10 01 010 000 01 1 01 0

The secondary database will pass f''=2 and $\delta_l=3$, and $\delta_h=9$ to its oracle.

Note that: $X_{u\_}v=X_{b\_}v=X_{b'}\_v=X_{b''}\_v=24$

When the proper user approaches the secondary database with $X_{u\_}i$, the secondary database evaluates the Hamming distance between it and the copy stored in its database: $X_{b'}\_i$, and finds out that $H(X_bu\_i, X_{b''}\_i)=9$ (note that no bit flipped by the primary database was also flipped (back) by the secondary database. The secondary database now queries its oracle whether this Hamming distance satisfies:

$|\delta_l-f''| \le H(X_{u\_}i, X_{b''}\_i) \le \delta_l+\delta_h$ namely: $1 \le 9 \le 11$. The answer is yes, and the user is admitted

4.4 Preventing Abuse of Stolen Credentials

Fingerprinting Data Technology Will Reverse Damage Due to Compromised Databases

Using the unary method for writing data, the identity of the data bits may be used to reverse damage due to compromised database. Let D be a data element in the form of an integer of value I. D will then be written as a string comprise of I bits. Let the I bits be assigned identities in a random fashion. There are $2^I$ possibilities to do so. Let the particular selection of I identities (randomly chosen) be given to a 'the owner' of that data: $D_o$. Let h be an integer such that h<I. Let $D_d$ be a representation of D with I bits such that the identities of the I bits in $D_d$ is has Hamming distance h from $D_o$: $H(D_o, D_d)=h$.

Let DB be a database which keeps a record of D such that when the owner of D requests access to the services of the database, that owner can be authenticated through comparing the data D used by the claimed owner to the record of D in the database. Such comparison is normal and is designed to prevent fraudsters to falsely steal the identity of the owner of D.

In the method proposed here the owner is given $D_o$ and the database is keeping on record $D_d$. The database will also keep in store the value of h. When the owner requests access to the database, the database will compute $h_c=H(D_o, D_d)$. If $h_c=h$ then the database concludes that the claimed owner is the bonafide owner.

A non-owner unaware of D will not be granted access under the owner name.

Now we consider the situation where the database is compromised and its records are copied by hackers.

As it happens so many times, the compromised data is sold to abusers who then use the knowledge of D from the database to claim the identity of the owner. This abuse can be stopped using the method herein. The reason is simple the database thief is not laying his hands on $D_o$—the version of the data held by the owner, but rather on $D_d$, the version of the data held by the database. And we know that $D_o \ne D_d$. When a would be identity thief approaches the database with $D_d$ he ill-gained in the previous break in to the database then the database will find the Hamming distance between the version forwarded by the thief and the version in the record to be $h_c=0$. It should be h. The face that it is zero immediately alerts the database to the fact that the database was compromised—because there is no other source to get $D_d$.

Aware of the compromise, the database will retrieve the off-line of where the exact image of the owner data ($D_o$) is kept, and derive from it a new record for its own files. So now the database will pick another integer $h' \ne h$, and create a record $D'_d \ne D_d$ where $H(D'_d, D_o)=h'$.

Even if the thief somehow finds the values of h and h' (which are kept secret, of course) he still cannot beat the system. Because while the thief may know h and h' he does not know which of the bits were flipped. The Hamming distance between $D_d$ and $D'_d$ is quite large (approximately $H(D_d, D'_d)=I/2$ because both representation were randomly chosen. So a flip of random h' bits in the stolen $D_d$ will likely not have a Hamming distance of h' from $D'_d$.

It would be prudent for the database, as a matter of course to refresh its data representation every so often, just in case there was an undetected breach.

Note: the database does keep an exact image of the owner data, ($D_o$) but off-line, not readily accessed by the database regular activity. This exact image is only necessary in order to recover from a breach, or to refresh the database, so this data may be kept away and requiring a complex physical action to retrieve and read. Also that owner data may be kept in non-rewritable format.

In summary this method negates the damage caused by a data breach and preserve the integrity of the rightful owners of data credentials. It is a method to represent data used to prove access credentials, in a unary way such that the value of the data is expressed through the bit-count of the data bit string, and the identities of the bits may be written in $2^n$ ways, where n is the bit count of the string; choosing randomly one of those ways (O), giving O to the party that needs to use that data to authenticate itself, and keeping a copy of O in an off-line file; then creating a string Ot that has a Hamming distance of t from O (H(O,Ot)=t), and keeping Ot in the verifier records so that the verifier will authenticate the submitter of O as bona fide if and only if the submission string has a Hamming distance of t from Ot. Upon a break-in to the database, and a compromise of Ot, one recalls the off-line file to retrieve O, and create a bit string comprised of n bits (Ou) such that the Hamming distance between O and Ou is (H(O, Ou)=u, where u< >t, and thereby prevent the thief of Ot from authenticating himself as a bona fide owner of O.

5.0 Bit Representation

The price to be paid for the benefit of data fingerprinting is in the form of a larger data pack. On its face the bit count ratio between the unary representation and the binary representation of value is $\eta = n/\log(n)$, for an n-bits long string. So for larger and larger numbers one is facing:

$$\lim(n/\log(n)) \to \infty \text{ for } n \to \infty$$

It is therefore that one needs to pick a high limit number, L for which the ratio $L/\log(L)$ will be acceptable. And for any number, however large W one will provide its expression via the unary formula, U:

$$W = U(w_1, w_2, \ldots w_m, \zeta_1, \zeta_2, \ldots \zeta_r)$$

where $w_i \leq L$ for $i=1,2, \ldots m$, and all $\zeta_j$, $j=1,2, \ldots r$ are fixed coefficients. There is sufficient flexibility in this format to write out any number and use only data items of the range 0 to L.

For example for numbers $W \gg L$ use:

$$W = w_1^{\zeta_1} + \lambda_2 w_2^{\zeta_2} + \ldots \lambda_r w_r^{\zeta_r} + w_0$$

where $\lambda_i$ is either +1, or −1. One would first find $w_1$ such that:

$$w_1^{\zeta_1} \leq W < (w_1+1)^{\zeta_1}$$

Then repeating the same with $W' = W - w_1^{\zeta_1}$.

Illustration: Let L=256 then $\eta = L/\log(L) = 256/8 = 32$. Let's represent W=1234567890. We seek $\zeta_1$ such that $W^{1/2\zeta_1} \sim L$. We find $1234567890^{1/4} \sim 187 < L = 256$. We compute: $187^4=1,222,830,961$, and $W = W - 187^4 = 11,736,929$ similarly we find $W'' = W' - 58^4 = 420,433$. Further: $W''' = W'' - 25^4 = 29,808$. And: $W'''' = 29808 = 172^2 + 224$.

We can therefore write: $W = 1234567890 = 187^4 + 58^4 + 25^4 + 172^2 + 224$

And thereby we wrote W=1234567890 using only numbers smaller than L=256. We used a total of: 187+58+25+172+224=666 bits for the fingerprinted data, and added to it 4 non-fingerprinted numbers: 4,4,4,2, which amount to 4 ASCII characters, so that the total memory requirement is 666+32=698 bits. We compare this to the 80 bit required to write down the 10 bytes W, and we compute a de-facto expansion of 698/80=8.72. Much lower than the $\eta = L/\text{Log}(L) = 256/8 = 32$. The economy here is quite clear, compared to the straight unary expression with a ratio of 1234567890/80=15,432,099.

5.1 Double and Multiple Alphabet

Fingerprinting may be readily implemented by using a double alphabet: a regular bit language and a fingerprinting bit language. Symbolically the fingerprinting bits will be marked with "black-white" (B=1,W=0), and all non-fingerprinted data will be marked as "red-green" (R=1,G=0). Hence an R and G string will be interpreted as a binary string written in ASCII, Base64, or any other normal binary language. A black-and-white string will be interpreted for its value as the count of letters (either black or white), and the fingerprinted (shadow) data will be interpreted by the particular black and white sequence.

Thus the sequence GRGRGRRG will be interpreted in regular binary as $(01010110)_{binary} = (86)_{decimal} = \text{'V'}_{ASCII}$. And BWWBWB will be interpreted as a value 6 with shadow 37.

The idea of the double alphabet is convenient to (i) identify start and finish of a unary data, (ii) to express large numbers with unary ingredient, and (iii) fit the unary data in a larger data package. For example: to express the following: 6+2−5, one would write:

6+2−5=BWWBBW GGRGRGRR BB GGRGRGRR BBWBB

The spaces between the substrings are there for readability only. The red-green strings serve to mark the beginning and the end of the black-white string marked by both value and shadow. The red-green strings are also ASCII interpreted: GGRGRGRR='+' and GGRGRRGR='−'.

One could use a third alphabet: yellow-purple, Y,P, and interpret Y,P symbols as, say, descriptive data of some sort. Say Y will mark the beginning of a unary number and P will mark the end of a unary number. Hence the above statement will be written as:

6+2−5=YBWWBBWP GGRGRGRR YBBP GGRGRGRR YBBWBBP

A double alphabet can be written with 2 bits letters, and a quarterly alphabet will require 3 bits per letter. In the above example one could set: W=00, B=11, R=10, G=01, and hence the bit representation of the above statement (written with B,W,R,G) will be:

6+2−5=1100 00111100 0101100110011010 1111 0101100110011010 1111001111

6.0 Procedure

Here is the fingerprinting general procedure:
6.1.0 Environment Definition:
6.1.1 One is identifying (i) data flow, and (ii) data processing units (Turing Machines) to jointly execute a fingerprinting procedure.
6.2.0 Representation
6.2.1 Data D, expected to be used in the environment (6.1.1) is marked for selective fingerprinting such that some data $D_{fp} \in D$ is to be fingerprinted.
6.2.2 In preparation for fingerprinting one is: (i) setting up an alphabet setting, (ii) a largest fingerprinted value, L, and (iii) a method to express any non-negative integer N with fingerprinted elements of size no larger than L These settings apply to all the relevant data processing units in the environment.
6.2.3 Each data processing unit in the environment is (i) setting up a deterministic procedure to determine the shadow values of the fingerprinted data issued by it. Then (ii) one is setting up a randomization procedure to superimpose the deterministic procedure for the shadow of the fingerprinted data.
6.3.0 Execution
6.3.1 Initial data $D_i$ is given to the environment from external sources, or is originally generated within the environment, and then according to the defined data flow, is triggering a data flow event that ends up with some terminal data $D_t$ either stored in the environment or communicated from the environment to external receptors.

6.4.0 Forensic Examination 6.4.1 A forensic examiner examines the fingerprinted data for integrity, and either validates it, or points out an integrity issue.

6.1 Environmental Definition

One is identifying (i) data flow, and (ii) data processing units (Turing Machines) to jointly execute a fingerprinting procedure.

The data processing units include data readers, data holders, and any device large or small that reads or generates data in any form, and transmits data to any receptor in any form.

6.2 Representation

Data D, expected to be used in the environment (1) is marked for selective fingerprinting such that some data $D_{fp} \in D$ is to be fingerprinted. There is no need to fingerprint all the data that is being processed. The purpose of the fingerprinting is forensic, not contents-inferential, and since fingerprinting is after all an extra burden, one would minimize the fingerprinted data to the extent needed. There is also the consideration of data expansion. In some applications this expansion may pose a problem that needs to be minimized.

In general a threat analysis should be conducted to identify the various ways in which the integrity of the operation may be harmed, and then one should design sufficient fingerprinting to take care of these threats.

In preparation for fingerprinting one is: (i) setting up an alphabet setting, (ii) a largest fingerprinted value, L, and (iii) a method to express any non-negative integer N with fingerprinted elements of size no larger than L These settings apply to all the relevant data processing units in the environment.

The defaults alphabet setting is a double alphabet. Marking fingerprinted data with one set of double bits, and marking all other data with another set of double bits. This will double the size of the data whether fingerprinted or not. As indicated every fingerprinted '0' will be written as '00' and every fingerprinted '1' will be written as '11', and for the rest of the data, every '0' will be '01' and every '1' will be '10'. This will allow for convenient marking of the beginning and the end of the fingerprinted string.

The size of L may be determined based on the specific terms of the environment. If L is too low then there is no room to have enough flipping variety. If L is too large then the η ratio of its unary size to regular size may be prohibitive. A reasonable choice is L_v=12 bits (L_i=4096). This choice will cover 2 Base64 characters, and two L units will cover 3 ASCII characters. One may note that flip-count may expand across several fingerprinted units. Illustration: Let L_v=8, L_i=256. The data to be encrypted is: Bob, which is 66 111 98, which is fingerprinted to:

```
Bob=00001010111100011001001110
    001101100101100110101010110
    1100101101111||1011111000010
    11000110000010111000110001
    100000000100101001110001100
    10001 1111100000000010001011111
    0110001000110011||11100100011
    1011000000010100011011110100
    110110000000001011011000010
    11111 001001011110100101010000001
``` where the || represents a string terminator.

A simple method to use numbers not larger than L to represent an arbitrary number Z may be to use an L based expansion: $Z = X_n L^n + X_{n-1} L^{n-1} + \ldots X_n L^0$ such that all $X_i$ (i=1,2, ... n)≤L−1, and one writes: $Z = X_n \| X_{n-1} \| \ldots X_0$, where '||' is the string terminator symbol.

Each data processing unit in the environment is (i) setting up a deterministic procedure to determine the shadow values of the fingerprinted data issued by it. Then (ii) one is setting up a randomization procedure to superimpose the deterministic procedure for the shadow of the fingerprinted data.

6.3 Execution

Initial data $D_i$ is given to the environment from external sources, or is originally generated within the environment, and then according to the defined data flow, is triggering a data flow event that ends up with some terminal data $D_t$ either stored in the environment, or communicated from the environment to external receptors. The value part of the fingerprinted data is processed in parallel to the shadow part of the data. Abandoning the shadow processing will set off an alarm.

FingerPrinting execution may require sources of randomness and construction of an oracle 6.3.1 Sources of Randomness FingerPrinting may require two type of randomness: reproducible and wild. Reproducible randomness is needed for the forensic step. It may be achieved via seed-based algorithmic randomness, which produces the same random sequence every time the same seed is employed. There are many algorithmic randomness options in the literature and in practice. The fingerprinting application will use any of them with the possibility of employing a randomness filter, or a randomness-upgrading procedure.

Selection of bits to flip, is an example of 'wild randomness' that does not need to be reproducible. Such randomness would be best produced by non-algorithmic sources which have recently become commercially available, like IDQ in Geneva.

6.3.2 Oracle Construction

The oracle will have to insure against a breach in which one could query the data it holds to find the result needed. A good oracle will answer yes/no only and will not extract other answers from its database. This can be achieved in several ways.

One way is to hash the data. Let an oracle be given n pairs of matching data: $(x_1, y_1), (x_2, y_2), \ldots (x_n, y_n)$. To query the oracle one would identify a pair $(x_j, y_j)$ and ask whether this pair is 'true', namely the oracle has a record of this pair. The answer is binary: yes/no. The idea of an oracle is that it will deny an answer to the question what is the y value that fits a particular $x_i$ value?

If the data is stored in plaintext then a smart enough hacker will find a way to it. Therefore one may opt to hash the data and keep only the hash values: $HASH(x_1, y_1)$, $HASH(x_2, y_2), \ldots HASH(x_n, y_n)$. When queried with a pair $(x_j, y_j)$, the oracle will first hash it: $HASH(x_j, y_j)$, and then check if this particular hash value is in the store list of hash values. The answer will be in the affirmative if found, and in the negative otherwise.

An alternative to hash is transposition. As described in patent application Ser. No. 15/594,637 (Cyber Passport). Each pair is divided to substrings according to an established procedure. The substrings are randomly transposed and the transposed version is kept in the oracle. The queried pair is also divided to substrings using the same procedure, and one checks if any of the transposed pairs is built of the same substrings as the queried pair.

6.4 Forensic

The forensic process is case dependent. Broadly speaking fingerprinting technology allows one to either (i) verify a claimed data pathway, or (ii) to extract a data pathway, or alternatively (iii) spot an inconsistency which alerts one to either an error or an intended breach. The basic idea is that when integrity is complied with then the value process of the data and shadow process of the data are both in good order, and in agreement over the data pathway. So any discrepancy is an alert for further investigation.

Generally forensic can be proceeded forward—from the initializing data to the terminal data, or backwards in the opposite direction. It can also be processed from both ends towards the middle.

While the details of the fingerprinting are best if they are kept in secret, the efficacy of fingerprinting should stay in tact if such details are exposed. One must take into account that all deterministic procedures for shadow construction may be compromised and hence fraudsters would beat the fingerprinting forensic inspection. However, there are plenty of counter measures. Mainly (i) randomization, and (ii) complexity.

Ad hoc randomization cannot be pre-compromised. The procedure might call for a particular shadow setting algorithm that would apply for a host of data exchanges. It would be too complex for an attacker to defraud such a complex system.

What is claimed is:

1. A method to represent access credentials, the method comprising:
   receiving a first access credential;
   generating a random data bit string O with a bit count that is equal to the value of the first access credential, wherein the identities of the bits of the random data bit string O are randomly selected from any of the potential $2^n$ permutations of bits, where n is the bit count of the random data bit string O;
   providing the generated random bit string O to a party for use as an authentication credential;
   storing a copy of the random data bit string O in an off-line file;
   creating a data bit string Ot that has a Hamming distance of t from the random data bit string O (H(O, Ot)=t);
   storing the data bit string Ot in a verifier; and
   authenticating, by the verifier, a submitter of a received second access credential as the party that was provided the generated random bit string O if and only if the received second access credential has the Hamming distance of t from the stored data bit string Ot.

2. The method of claim 1, where upon a break-in to the database, and a compromise of Ot:
   retrieving the random data bit string O from the off-line file; and
   creating a data bit string Ou comprised of n bits that has a Hamming distance of u from the random data bit string O(H(O, Ou)=u), where u does not equal t, thereby preventing a thief of data bit string Ot from authenticating themselves as the party that was provided the generated random data bit string O.

3. A non-transitory computer-readable storage device with computer-executable instructions stored thereon that, when executed by one or more computer processors, cause the one or more computer processors to perform operations comprising:
   receiving a first access credential;
   generating a random data bit string O with a bit count that is equal to the value of the first access credential, wherein the identities of the bits of the random data bit string O are randomly selected from any of the potential $2^n$ permutations of bits, where n is the bit count of the random data bit string O;
   providing the generated random bit string O to a party for use as an authentication credential;
   storing a copy of the random data bit string O in an off-line file;
   creating a data bit string Ot that has a Hamming distance of t from the random data bit string O (H(O, Ot)=t);
   storing the data bit string Ot in a verifier; and
   authenticating, by the verifier, a submitter of a received second access credential as the party that was provided the generated random bit string O if and only if the received second access credential has the Hamming distance of t from the stored data bit string Ot.

4. The non-transitory computer-readable storage device of claim 3, where upon a break-in to the database, and a compromise of Ot, the computer-executable instructions to further cause the one or more computer processors to perform operations comprising:
   retrieving the random data bit string O from the off-line file; and
   creating a data bit string Ou comprised of n bits that has a Hamming distance of u from the random data bit string O(H(O, Ou)=u), where u does not equal t, thereby preventing a thief of data bit string Ot from authenticating themselves as the party that was provided the generated random data bit string O.

5. A computer system, the computer system comprising:
   a computer processor; and
   a memory device storing computer-executable instructions that, when executed by the computer processor, causes the computer processor to perform operations comprising:
   receiving a first access credential;
   generating a random data bit string O with a bit count that is equal to the value of the first access credential, wherein the identities of the bits of the random data bit string O are randomly selected from any of the potential $2^n$ permutations of bits, where n is the bit count of the random data bit string O;
   providing the generated random bit string O to a party for use as an authentication credential;
   storing a copy of the random data bit string O in an off-line file;
   creating a data bit string Ot that has a Hamming distance of t from the random data bit string O (H(O, Ot)=t);
   storing the data bit string Ot in a verifier; and
   authenticating, by the verifier, a submitter of a received second access credential as the party that was provided the generated random bit string O if and only if the received second access credential has the Hamming distance of t from the stored data bit string Ot.

6. The computer system of claim 5, where upon a break-in to the database, and a compromise of Ot, the computer-executable instructions to further cause the computer processor to perform operations comprising:

retrieving the random data bit string O from the off-line file; and creating a data bit string Ou comprised of n bits that has a Hamming distance of u from the random data bit string O(H(O, Ou)=u), where u does not equal t, thereby preventing a thief of data bit string Ot from authenticating themselves as the party that was provided the generated random data bit string O.

* * * * *